United States Patent
Tada et al.

(10) Patent No.: US 11,104,216 B2
(45) Date of Patent: Aug. 31, 2021

(54) VEHICLE DRIVE APPARATUS

(71) Applicant: AISIN AW CO., LTD., Anjo (JP)

(72) Inventors: Yohei Tada, Nagoya (JP); Yuichi Seki, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 302 days.

(21) Appl. No.: 16/473,657

(22) PCT Filed: Mar. 27, 2018

(86) PCT No.: PCT/JP2018/012490
§ 371 (c)(1),
(2) Date: Jun. 26, 2019

(87) PCT Pub. No.: WO2018/181352
PCT Pub. Date: Oct. 4, 2018

(65) Prior Publication Data
US 2019/0351752 A1 Nov. 21, 2019

(30) Foreign Application Priority Data

Mar. 28, 2017 (JP) .............................. JP2017-062879

(51) Int. Cl.
*H02K 9/19* (2006.01)
*B60K 6/387* (2007.10)
(Continued)

(52) U.S. Cl.
CPC ................ *B60K 6/387* (2013.01); *B60K 6/26* (2013.01); *F16D 13/72* (2013.01); *H02K 7/006* (2013.01);
(Continued)

(58) Field of Classification Search
CPC ........... B60K 6/26; B60K 6/387; F16D 13/72; H02K 7/006; H02K 7/108; H02K 9/19
See application file for complete search history.

(56) References Cited

U.S. PATENT DOCUMENTS

| 2006/0144665 A1 | 7/2006 | Janson et al. |
| 2007/0049445 A1* | 3/2007 | Reisch .................... F16D 21/06 475/5 |

(Continued)

FOREIGN PATENT DOCUMENTS

| JP | 2014-15188 A | 1/2014 |
| JP | 2014-33602 A | 2/2014 |

(Continued)

OTHER PUBLICATIONS

May 29, 2018 Search Report issued in International Patent Application No. PCT/JP2018/012490.

*Primary Examiner* — Huan Le
(74) *Attorney, Agent, or Firm* — Oliff PLC

(57) ABSTRACT

A vehicle drive apparatus that includes an engagement device, a rotating electrical machine, and a frictional engagement device on a power transfer path connecting an input drivably coupled to an internal combustion engine and an output drivably coupled to a wheel, wherein: a cooling oil passage provided in an area where the engagement device is arranged and configured such that oil for cooling the rotating electrical machine passes through the cooling oil passage and an inflow suppression provided between the engagement device and the frictional engagement device and configured to suppress occurrence of a situation in which oil passing through the frictional engagement device flows into the cooling oil passage are provided inside the tube.

20 Claims, 4 Drawing Sheets

(51) Int. Cl.
  *B60K 6/26* (2007.10)
  *F16D 13/72* (2006.01)
  *H02K 7/00* (2006.01)
  *H02K 7/108* (2006.01)
  *B60K 6/40* (2007.10)
  *B60K 6/48* (2007.10)

(52) U.S. Cl.
  CPC ............ *H02K 7/108* (2013.01); *H02K 9/19* (2013.01); *B60K 6/40* (2013.01); *B60K 6/48* (2013.01); *B60Y 2200/92* (2013.01); *B60Y 2400/4244* (2013.01)

(56) References Cited

U.S. PATENT DOCUMENTS

2014/0331945 A1  11/2014 Kasuya et al.
2016/0082825 A1* 3/2016 Ruder ................. H02K 7/10
                                                          192/113.21
2017/0203643 A1  7/2017 Suyama et al.
2017/0261045 A1* 9/2017 Chamberlin .......... F16D 25/123

FOREIGN PATENT DOCUMENTS

JP      2015-042532 A    3/2015
WO     2016/17369 A1    2/2016

* cited by examiner

VEHICLE DRIVE APPARATUS

BACKGROUND

The present disclosure relates to a vehicle drive apparatus in which a power transfer path connecting an input member drivably coupled to an internal combustion engine and an output member drivably coupled to wheels is provided with an engagement device, a rotating electrical machine, and a frictional engagement device in order from the input member side.

As this vehicle drive apparatus, there is known, for example, a vehicle drive apparatus described in U.S. Patent Application Publication No. 2006/0144665 (US 2006/0144665 A1). In the section of Background Art, description is given below quoting reference symbols and member names of US 2006/0144665 A1 in "[ ]". In the vehicle drive apparatus of US 2006/0144665 A1, a first frictional engagement device [clutch 34] and a second frictional engagement device [clutch 36] are arranged side by side in an axial direction L. The two frictional engagement devices [clutch 36, clutch 34] are arranged on an inner side of a rotating electrical machine [motor 14] so as to overlap the rotating electrical machine [motor 14] at least in part when viewed in a radial direction R. The rotating electrical machine [motor 14] includes a rotor [12] and a rotor support member that supports the rotor [12]. In the rotor support member, a tubular portion [outer cylindrical drum 27] arranged on a radially outer side of the two frictional engagement devices [clutch 36, clutch 34] has first holes [70] formed through the tubular portion [outer cylindrical drum 27] in the radial direction. The two frictional engagement devices [clutch 36, clutch 34] include clutch shells [60, 78], respectively. The clutch shell [60] arranged on the radially outer side of the second frictional engagement device [clutch 36] has second holes [72] formed through the clutch shell [60] in the radial direction R. Thus, oil passing through the two frictional engagement devices [clutch 36, clutch 34] passes through the first holes [70] to flow radially outward beyond the tubular portion [outer cylindrical drum 27]. Alternatively, the oil passes through the second holes [72] and then through the first holes [70] or over an axial end of the tubular portion [outer cylindrical drum 27] to flow radially outward. In this manner, the oil flowing radially outward beyond the tubular portion [outer cylindrical drum 27] is supplied to the rotating electrical machine [motor 14].

SUMMARY

As described above, the vehicle drive apparatus of US 2006/0144665 A1 is structured such that the oil passing through the two frictional engagement devices [clutch 36, clutch 34] is supplied to the rotating electrical machine [motor 14]. In this structure, if the temperature of the oil passing through the two frictional engagement devices [clutch 36, clutch 34] is relatively low, the rotating electrical machine [14] can be cooled appropriately. However, there is a possibility that the rotating electrical machine [14] cannot be cooled appropriately if high temperature oil heated by frictional heat or the like when passing through the two frictional engagement devices [clutch 36, clutch 34] is supplied to the rotating electrical machine [motor 14] as in a case where any one of the two frictional engagement devices [clutch 36, clutch 34] is in slip engagement.

Therefore, there is a demand to attain a vehicle drive apparatus in which a rotating electrical machine can be cooled appropriately when a plurality of engagement devices are arranged on a radially inner side of the rotating electrical machine.

In view of the above, a characteristic structure of a vehicle drive apparatus is as follows. The vehicle drive apparatus includes an engagement device, a rotating electrical machine, and a frictional engagement device on a power transfer path connecting an input drivably coupled to an internal combustion engine and an output drivably coupled to a wheel. The engagement device, the rotating electrical machine, and the frictional engagement device are provided in order from the input.

The engagement device and the frictional engagement device are arranged side by side in an axial direction. The engagement device and the frictional engagement device are arranged on a radially inner side of the rotating electrical machine so as to overlap the rotating electrical machine at least in part when viewed in a radial direction. The rotating electrical machine includes a rotor and a rotor support that supports the rotor. The rotor support includes a tube located on a radially inner side of the rotor, extending in the axial direction, and formed into a tubular shape. A cooling oil passage provided in an area where the engagement device is arranged and configured such that oil for cooling the rotating electrical machine passes through the cooling oil passage and an inflow suppression provided between the engagement device and the frictional engagement device and configured to suppress occurrence of a situation in which oil passing through the frictional engagement device flows into the cooling oil passage are provided inside the tube.

According to this structure, the oil flowing through the cooling oil passage is supplied to the rotating electrical machine, and therefore the rotating electrical machine can be cooled by the oil. The inflow suppression suppresses the occurrence of the situation in which the oil passing through the frictional engagement device flows into the cooling oil passage. Therefore, it is possible to suppress the occurrence of the situation in which the relatively high temperature oil heated by passing through the frictional engagement device flows into the cooling oil passage, and thus suppress an increase in the temperature of the oil flowing through the cooling oil passage. As a result, the relatively low temperature oil can be supplied to the rotating electrical machine, and accordingly the rotating electrical machine can be cooled appropriately.

DETAILED DESCRIPTION OF EMBODIMENTS

An embodiment of a vehicle drive apparatus 1 is described with reference to the drawings. The vehicle drive apparatus 1 according to this embodiment is a vehicle drive apparatus (hybrid vehicle drive apparatus) for driving a vehicle (hybrid vehicle) including both an internal combustion engine E and a rotating electrical machine MG that function as drive sources for wheels W. Specifically, the vehicle drive apparatus 1 is structured as a drive apparatus for a single-motor parallel type hybrid vehicle.

In the following description, an "axial direction L", a "radial direction R", and a "circumferential direction" are defined with respect to a rotation axis of the rotating electrical machine MG (axis X illustrated in FIG. 2) unless otherwise noted. A side relatively close to the internal combustion engine E (right side in FIG. 2) that is one side in the axial direction L is defined as a first axial side L1. A side relatively close to a transmission TM (left side in FIG. 2) that is a side (other side in the axial direction L) opposite to the first axial side L1 is defined as a second axial side L2. A side close to the axis X that is one side in the radial direction R is defined as a radially inner side R1. A side opposite to the radially inner side R1 is defined as a radially outer side R2. Directions of respective members are directions in a state in which the members are attached to the vehicle drive apparatus 1. Terms related to the directions, positions, and the like of the respective members are concepts that encompass a condition with a difference caused by a deviation permissible in manufacturing.

In this embodiment, an expression "drivably couple" refers to a state in which two rotary elements are coupled together so that a driving force (synonymous with a torque) is transferable therebetween. This concept encompasses a state in which the two rotary elements are coupled together so as to rotate together, and a state in which the two rotary elements are coupled together so that the driving force is transferable therebetween via one or more transmission members. The transmission members include various members (such as a shaft, a gear mechanism, and a belt) configured to transfer rotation at the same speed or at a variable speed, and may include engagement devices (such as a frictional engagement device and an intermesh engagement device) configured to selectively transfer the rotation and the driving force.

Regarding arrangement of two members (concept that encompasses intangibles such as a hole), an expression "overlap when viewed in a certain direction" means that, when an imaginary straight line parallel to the viewing direction is moved in directions orthogonal to the imaginary straight line, an area where the imaginary straight line intersects the two members exists at least in part.

1. Overall Structure of Vehicle Drive Apparatus

Figure 1:
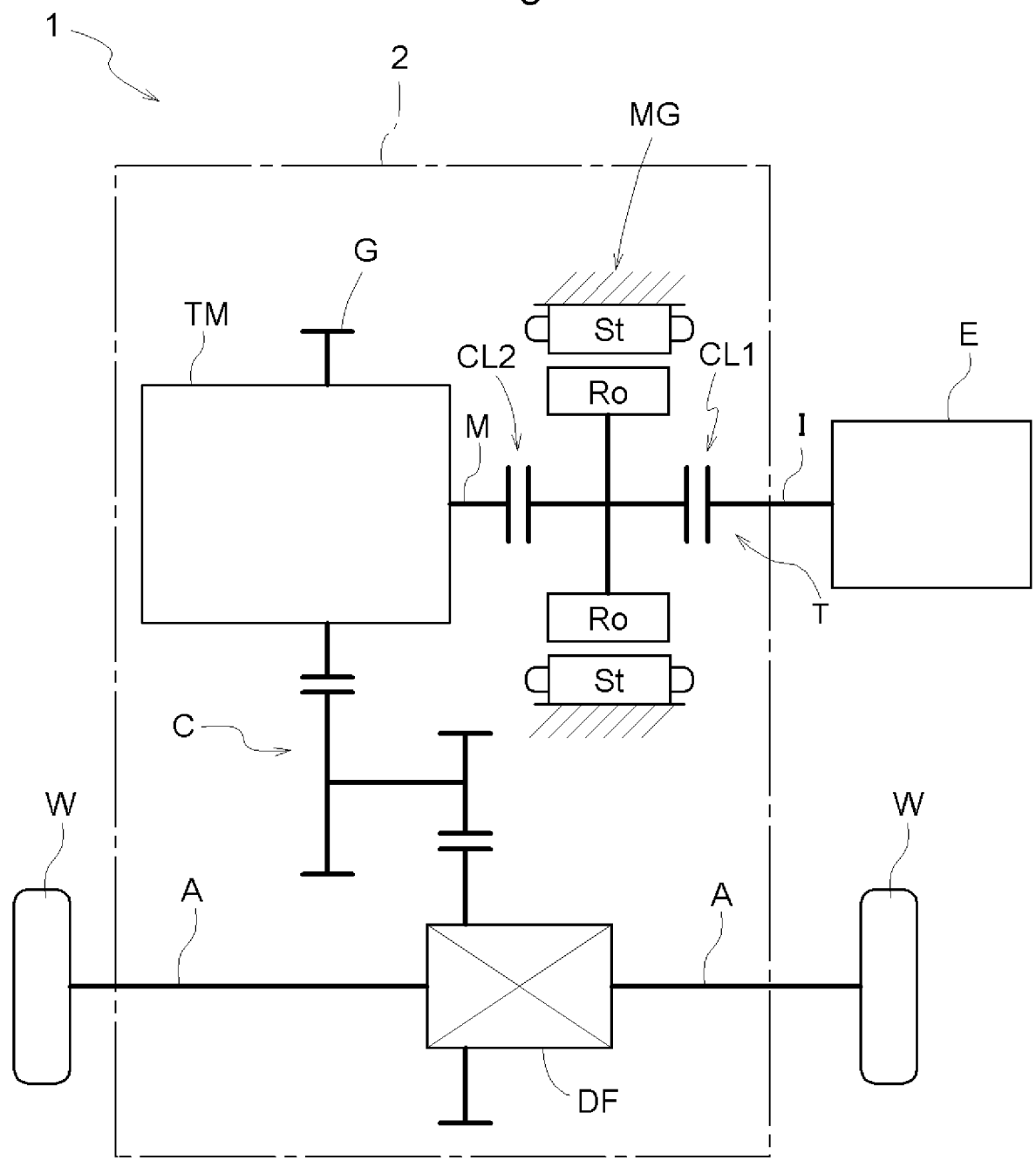
FIG. 1 is a schematic diagram illustrating the overall structure of a vehicle drive apparatus according to an embodiment.
Figure 2:
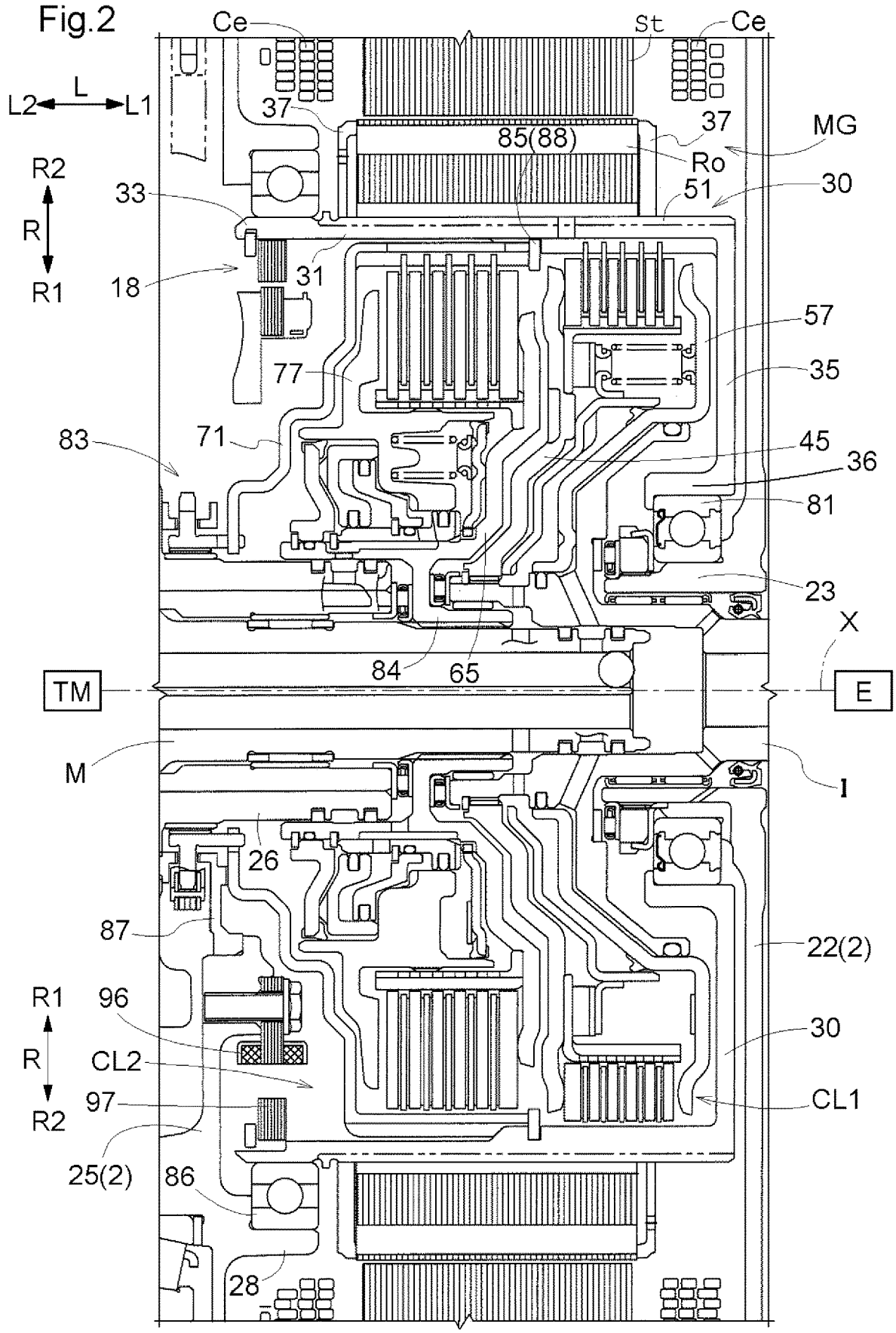
FIG. 2 is a local sectional view of the vehicle drive apparatus.

The overall structure of the vehicle drive apparatus 1 according to this embodiment is described. As illustrated in FIG. 1, the vehicle drive apparatus 1 includes an input shaft I serving as an input member drivably coupled to the internal combustion engine E, an intermediate shaft M serving as an output member drivably coupled to the wheels W, the rotating electrical machine MG, a first frictional engagement device CL1 (corresponding to an engagement device), and a second frictional engagement device CL2 (corresponding to a frictional engagement device). The first frictional engagement device CL1, the rotating electrical machine MG, and the second frictional engagement device CL2 are provided in the stated order from the input shaft I side on a power transfer path T connecting the input shaft I and the intermediate shaft M together. As illustrated in FIG. 2, the first frictional engagement device CL1 and the second frictional engagement device CL2 are arranged side by side in the axial direction L. The first frictional engagement device CL1 is located on the first axial side L1 of the second frictional engagement device CL2. That is, the first axial side L1 is a side where the first frictional engagement device CL1 is located relative to the second frictional engagement device CL2 in the axial direction L, and the second axial side L2 is a side opposite of the second frictional engagement device CL2 from the first axial side L1. The first frictional engagement device CL1 and the second frictional engagement device CL2 are arranged on the radially inner side R1 of the rotating electrical machine MG so as to overlap the rotating electrical machine MG at least in part when viewed in the radial direction R.

As illustrated in FIG. 1, the vehicle drive apparatus 1 includes the transmission TM, a counter gear mechanism C, and a differential gear device DF. Those components are housed in a case (drive apparatus case) 2.

The internal combustion engine E is a prime mover (such as a gasoline engine or a diesel engine) configured to produce driving power by being driven through combustion of fuel inside the engine. In this embodiment, the input shaft I is drivably coupled to an output shaft (such as a crankshaft) of the internal combustion engine E via a damper (not illustrated). The input shaft I may drivably be coupled to the output shaft of the internal combustion engine E without intervention of the damper.

The first frictional engagement device CL1 is provided between the input shaft I and the rotating electrical machine MG on the power transfer path T. The first frictional engagement device CL1 couples or decouples the input shaft I drivably coupled to the internal combustion engine E and the rotating electrical machine MG. The first frictional engagement device CL1 functions as an internal combustion engine disconnection engagement device configured to disconnect the internal combustion engine E from the wheels W. The first frictional engagement device CL1 is structured as a hydraulic-drive frictional engagement device. The engagement state (direct engagement state/slip engagement state/disengagement state) of the first frictional engagement device CL1 is controlled based on a hydraulic pressure supplied to the first frictional engagement device CL1.

The rotating electrical machine MG can function as a motor (electric motor) configured to generate driving power through supply of electric power, and as a generator (electric generator) configured to generate electric power through supply of driving power. Therefore, the rotating electrical machine MG is electrically connected to an electric storage device (such as a battery or a capacitor). The rotating electrical machine MG performs power running through supply of electric power from the electric storage device, or stores electric power generated by a torque of the internal combustion engine E or an inertial force of the vehicle by supplying the electric power to the electric storage device.

The second frictional engagement device CL2 is provided between the rotating electrical machine MG and the transmission TM on the power transfer path T. The second frictional engagement device CL2 couples or decouples the rotating electrical machine MG and the intermediate shaft M drivably coupled to the transmission TM. The second frictional engagement device CL2 is structured as a hydraulic-drive frictional engagement device. The engagement state (direct engagement state/slip engagement state/disengagement state) of the second frictional engagement device CL2 is controlled based on a hydraulic pressure supplied to the second frictional engagement device CL2.

In this embodiment, the transmission TM is a stepped automatic transmission including a plurality of shifting engagement devices and switchably having a plurality of shift speeds with different speed ratios. As the transmission TM, there may be used, for example, a stepless automatic transmission capable of changing speed ratios steplessly, or a manual transmission switchably having a plurality of shift speeds with different speed ratios. The transmission TM performs shifting and torque conversion on rotation and a torque input to the intermediate shaft M based on a speed ratio at each time, and transfers the rotation and the torque to a shifting output gear G.

The shifting output gear G is drivably coupled to the differential gear device DF via the counter gear mechanism C. The differential gear device DF is drivably coupled to the wheels W via axles A. The differential gear device DF transfers the rotation and the torque input to the differential gear device DF while distributing the rotation and the torque to the two left and right wheels W. Thus, the vehicle drive apparatus 1 can cause the vehicle to travel by transferring the torque of one or both of the internal combustion engine E and the rotating electrical machine MG to the wheels W.

The vehicle drive apparatus 1 according to this embodiment has a multi-shaft structure in which the input shaft I and the intermediate shaft M are arranged coaxially with each other and the axles A are arranged in parallel to each other and non-coaxially with the input shaft I and the intermediate shaft M. This structure is suited as a structure of the vehicle drive apparatus 1 to be mounted on, for example, a front-engine front-drive (FF) vehicle.

2. Structures of Respective Parts of Vehicle Drive Apparatus

Description is given of the structures of respective parts of the vehicle drive apparatus 1 according to this embodiment. As illustrated in FIG. 2, the case 2 includes a first support wall 22 that closes an opening of a peripheral wall on the first axial side L1. The peripheral wall covers outer peripheries of housed components such as the rotating electrical machine MG, the first frictional engagement device CL1, the second frictional engagement device CL2, and a rotation sensor 18. The case 2 also includes a second support wall 25 arranged between the rotating electrical machine MG and the transmission TM on the second axial side L2 of the first support wall 22.

The first support wall 22 is located on the first axial side L1 of the rotating electrical machine MG, the first frictional engagement device CL1, and the second frictional engagement device CL2, and extends in the radial direction R and the circumferential direction. The first support wall 22 is arranged adjacent to the rotating electrical machine MG and the like on the first axial side L1. The first support wall 22 has a through hole in the axial direction L. The input shaft I is inserted through the through hole. Thus, the input shaft I is inserted into the case 2 through the first support wall 22. A cylindrical first protrusion 23 that protrudes in the axial direction L toward the second axial side L2 is provided at an end of the first support wall 22 on the radially inner side R1. With the first protrusion 23, the first support wall 22 rotatably supports a rotor support member 30 via an input bearing 81.

The second support wall 25 is located on the second axial side L2 of the rotating electrical machine MG, the first frictional engagement device CL1, and the second frictional engagement device CL2, and extends in the radial direction R and the circumferential direction. The second support wall 25 is arranged adjacent to the rotating electrical machine MG and the like on the second axial side L2. A cylindrical sleeve 26 that protrudes in the axial direction L toward the first axial side L1 is provided at an end of the second support wall 25 on the radially inner side R1. The intermediate shaft M is inserted through the sleeve 26. Thus, the intermediate shaft M is arranged in the case 2 through the second support wall 25. The second support wall 25 has a cylindrical second protrusion 28 that protrudes toward the first axial side L1.

With the second protrusion 28, the second support wall 25 rotatably supports the rotor support member 30 via a bearing 86.

The rotating electrical machine MG includes a stator St fixed to the case 2, a rotor Ro supported so as to be rotatable relative to the case 2, and the rotor support member 30 that supports the rotor Ro. The stator St includes coil end portions Ce on both sides in the axial direction L. The rotor Ro is arranged on the radially inner side R1 of the stator St. The rotor Ro is supported so as to be rotatable relative to the case 2 via the rotor support member 30.

As illustrated in FIG. 2, the rotor support member 30 that supports the rotor Ro includes a tubular support portion 31 serving as a tubular portion located on the radially inner side R1 of the rotor Ro, extending in the axial direction L, and formed into a tubular shape, a plate-shaped support portion 35 extending from the tubular support portion 31 toward the radially inner side R1, and a pair of rotor holding portions 37 extending radially outward from the tubular support portion 31. The rotor support member 30 supports the rotor Ro in a state in which the pair of rotor holding portions 37 are in contact with the rotor Ro from the second axial side L2 and the first axial side L1 and the tubular support portion 31 is in contact with the rotor Ro from the radially inner side R1. That is, the rotor Ro is supported on an outer peripheral surface of the tubular support portion 31. The rotor Ro is supported on the rotor support member 30 so that movement of the rotor Ro in the axial direction L relative to the tubular support portion 31 is restricted and the rotor Ro rotates together with the tubular support portion 31. The tubular support portion 31 is formed so as to be open to the second axial side L2 (second support wall 25 side). That is, a space on the radially inner side R1 of the tubular support portion 31 is closed by the plate-shaped support portion 35 on the first axial side L1, and is open on the second axial side L2. An end of an opening of the tubular support portion 31 on the second axial side L2 is herein referred to as a support open end 33. The support open end 33 is arranged at a position where the support open end 33 overlaps a coil end portion Ce when viewed in the radial direction R. In this example, the support open end 33 is arranged at a position where the support open end 33 overlaps the coil end portion Ce on the second axial side L2 (second support wall 25 side).

In this embodiment, the plate-shaped support portion 35 is formed into a shape of an annular plate extending toward the radially inner side R1 from an end of the tubular support portion 31 on the first axial side L1. A cylindrical third protrusion 36 that protrudes toward the second axial side L2 is provided at an end of the plate-shaped support portion 35 on the radially inner side R1.

The rotor support member 30 is supported on the case 2 in the radial direction R by the input bearing 81 arranged between the third protrusion 36 and the first protrusion 23 and the bearing 86 arranged between the support open end 33 and the second protrusion 28.

Figure 3:
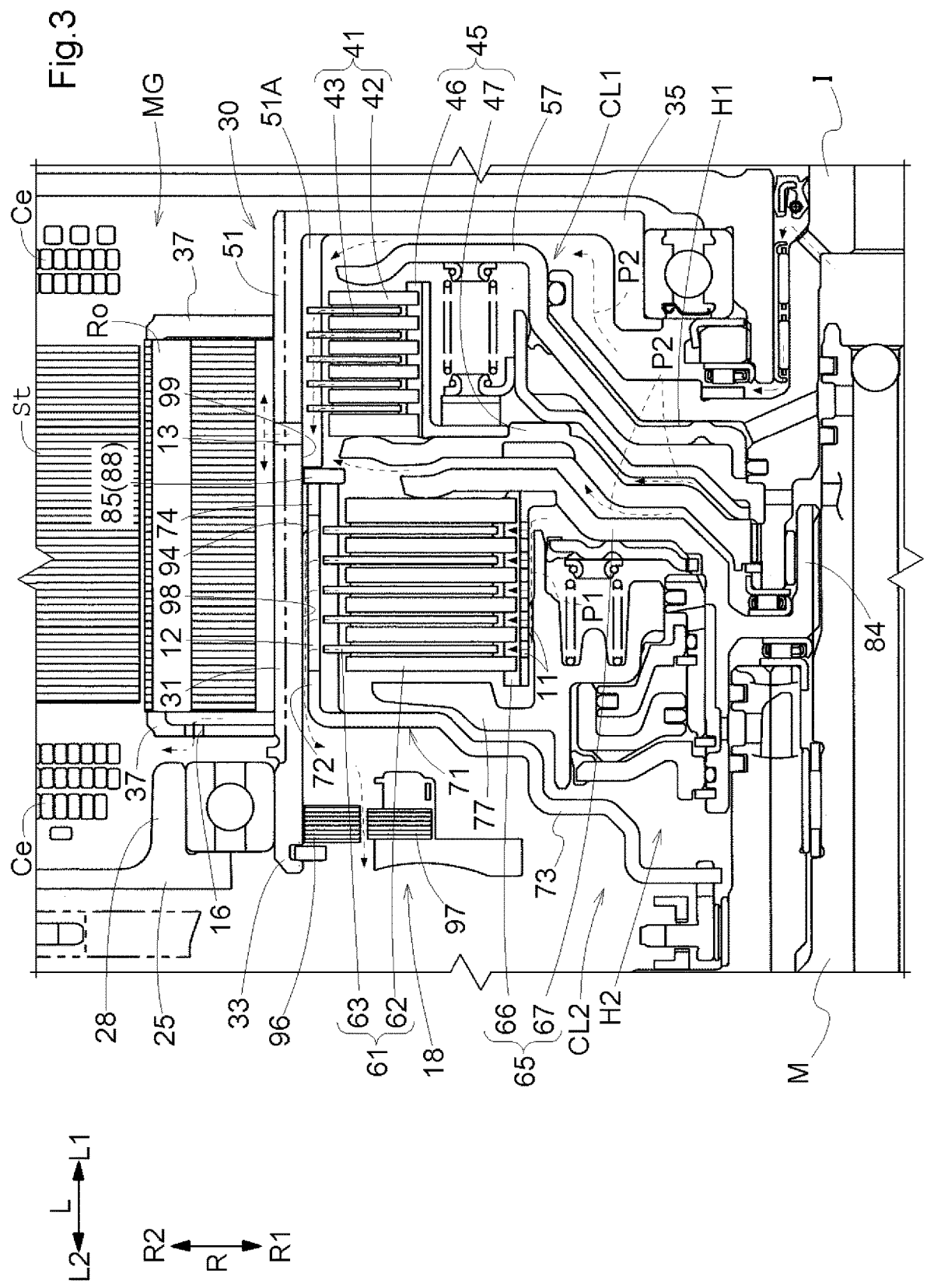
FIG. 3 is a sectional view of a main part of the vehicle drive apparatus.
Figure 4:
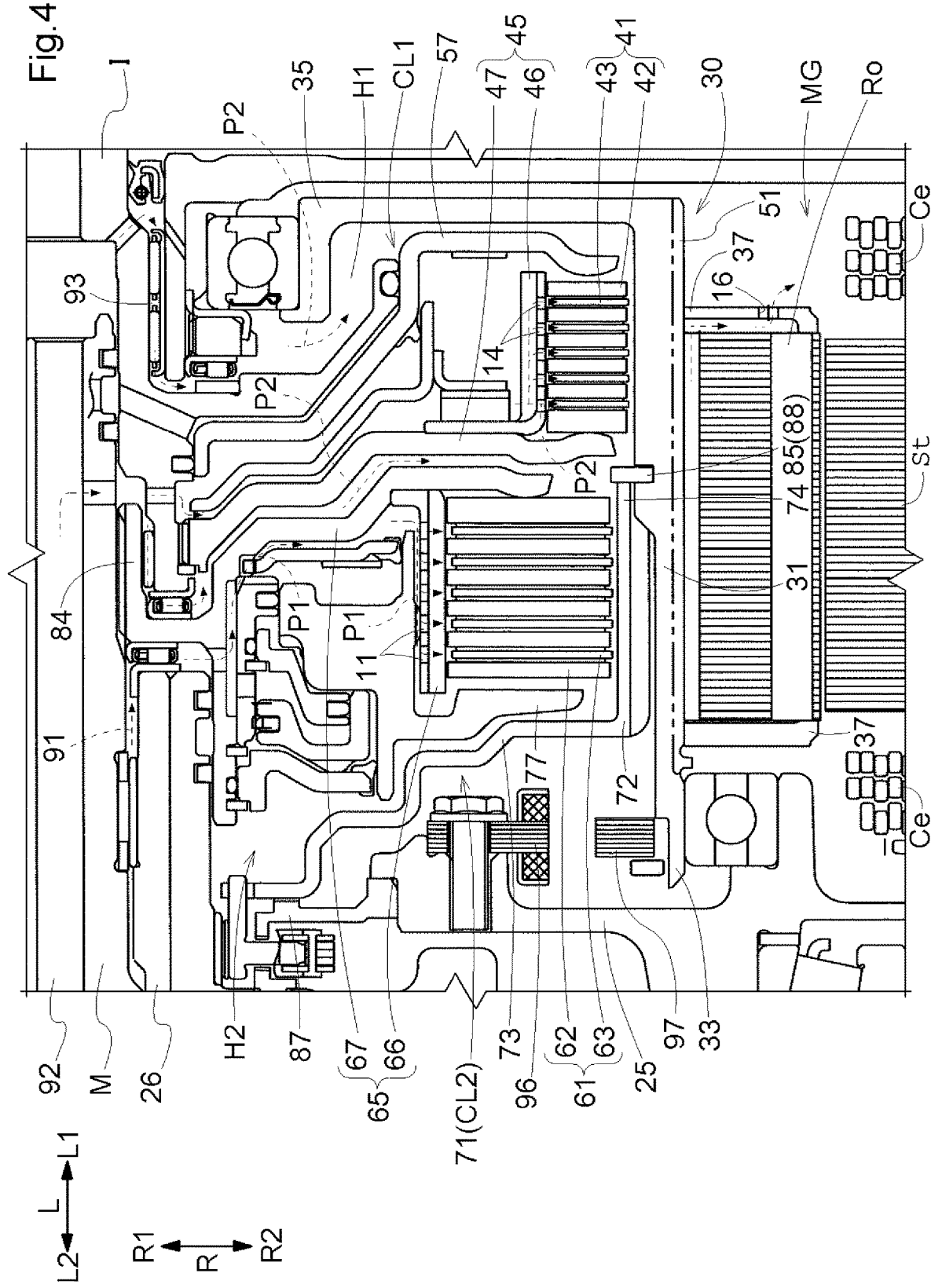
FIG. 4 is a sectional view of a main part of the vehicle drive apparatus.

As illustrated in FIG. 2 to FIG. 4, the first frictional engagement device CL1 is a wet frictional engagement device including first friction members 41, a first inner support member 45, a first outer support member 51, and a first pressing member 57. The members that structure the first frictional engagement device CL1 are arranged coaxially with the input shaft I and the intermediate shaft M. The first frictional engagement device CL1 is arranged on the radially inner side R1 of the rotor Ro of the rotating electrical machine MG and at a position where the first frictional engagement device CL1 overlaps the rotor Ro when viewed in the radial direction R.

The first friction members 41 include first inner friction members 42 and first outer friction members 43 provided in pairs (see FIG. 4). Both the first inner friction members 42 and the first outer friction members 43 are formed into annular plate shapes, and are arranged such that their rotation axes coincide with each other. A plurality of first inner friction members 42 and a plurality of first outer friction members 43 are provided, and are alternately arranged along the axial direction L. One of the first inner friction member 42 and the first outer friction member 43 may be a friction plate, and the other may be a separate plate.

The first inner support member 45 includes a first inner tubular portion 46 that supports the first inner friction members 42 from the radially inner side R1, and a first inner plate-shaped portion 47 extending from the first inner tubular portion 46 toward the radially inner side R1. The first inner tubular portion 46 is formed into a shape of a cylinder extending along the axial direction L. The first inner tubular portion 46 is formed so as to be open to the internal combustion engine E side (first axial side L1). At an outer peripheral portion of the first inner tubular portion 46, a plurality of spline teeth extending in the axial direction L are formed while being distributed in the circumferential direction. Similar spline teeth are formed at inner peripheral portions of the first inner friction members 42. In a state in which both the spline teeth engage with each other, the first inner friction members 42 are supported by the first inner support member 45 from the radially inner side R1. Thus, the first inner friction members 42 are supported so as to be slidable in the axial direction L in a state in which rotation of the first inner friction members 42 relative to the first inner support member 45 is restricted. Fourth through holes 14 extending through the first inner tubular portion 46 in the radial direction R (communicating an inner peripheral surface and an outer peripheral surface of the first inner tubular portion 46) are formed in the first inner tubular portion 46.

The first inner plate-shaped portion 47 is a member having a shape of an annular plate extending toward the radially inner side R1 from an end of the first inner tubular portion 46 on the second axial side L2. The first inner plate-shaped portion 47 is coupled to the first inner tubular portion 46 so as to rotate together with the first inner tubular portion 46. The first inner plate-shaped portion 47 is coupled to the input shaft I at the end on the radially inner side R1. Thus, the first inner tubular portion 46 and the input shaft I are coupled together via the first inner plate-shaped portion 47.

The first outer support member 51 is formed into a shape of a cylinder extending along the axial direction L. At an inner peripheral portion of the first outer support member 51, a plurality of spline teeth 51A (corresponding to engagement grooves) extending in the axial direction L are formed while being distributed in the circumferential direction. Similar spline teeth are formed at outer peripheral portions of the first outer friction members 43. In a state in which both the spline teeth engage with each other, the first outer friction members 43 are supported by the first outer support member 51 from the radially outer side R2. Thus, the first outer friction members 43 are supported so as to be slidable in the axial direction L in a state in which rotation of the first outer friction members 43 relative to the first outer support member 51 is restricted.

The first outer support member 51 is structured by a part of the tubular support portion 31. To give an additional description, a ring-shaped partition member 85 is attached to an inner peripheral surface of the tubular support portion 31. The partition member 85 partitions the inner peripheral surface of the tubular support portion 31 into a first area 98 and a second area 99. The first area 98 and the second area 99 are formed side by side in the axial direction L. The plurality of spline teeth 51A are formed on the tubular support portion 31 while being distributed in the circumferential direction at a part of an inner peripheral portion of the tubular support portion 31 where the second area 99 is formed, that is, a part of the tubular support portion 31 that is located between the partition member 85 and the plate-shaped support portion 35. The first outer support member 51 is structured by the part of the tubular support portion 31 that is located between the partition member 85 and the plate-shaped support portion 35, that is, structured by a part of the tubular support portion 31. The first outer friction members 43 are supported by the tubular support portion 31 from the radially outer side R2. A diameter of an outer peripheral surface of the partition member 85 is equal to or larger than an outside diameter of a recess of the spline tooth 51A of the tubular support portion 31, which is recessed toward the radially outer side R2. In this embodiment, the diameter of the outer peripheral surface of the partition member 85 is equal to the outside diameter of the recess of the spline tooth 51A. Third through holes 13 extending through the first outer support member 51 in the radial direction R (communicating an inner peripheral surface and an outer peripheral surface of the first outer support member 51) are formed in the first outer support member 51.

The first pressing member 57 is a member (first piston) configured such that, when oil having a predetermined hydraulic pressure is supplied to a first hydraulic oil chamber H1 from a hydraulic controller (not illustrated), the first pressing member 57 slides in the axial direction L depending on the hydraulic pressure to press the first friction members 41. The first pressing member 57 presses the first friction members 41 toward the second axial side L2.

As illustrated in FIG. 2 to FIG. 4, the second frictional engagement device CL2 is a wet frictional engagement device including second friction members 61, a second inner support member 65, a second outer support member 71, and a second pressing member 77. The members that structure the second frictional engagement device CL2 are arranged coaxially with the input shaft I and the intermediate shaft M. The second frictional engagement device CL2 is arranged on the radially inner side R1 of the rotor Ro of the rotating electrical machine MG and at a position where the second frictional engagement device CL2 overlaps the rotor Ro when viewed in the radial direction R. In this embodiment, the second frictional engagement device CL2 is arranged on the radially inner side R1 of the inner peripheral surface of the tubular support portion 31 and at a position where the second frictional engagement device CL2 overlaps the tubular support portion 31 when viewed in the radial direction R, and is also arranged on the second axial side L2 of the plate-shaped support portion 35.

The second friction members 61 include second inner friction members 62 and second outer friction members 63 provided in pairs (see FIG. 4). The structures of the second inner friction members 62 and the second outer friction members 63 may be similar to the structures of the first inner friction members 42 and the first outer friction members 43 described above.

The second inner support member 65 includes a second inner tubular portion 66 that supports the second inner friction members 62 from the radially inner side R1, and a second inner plate-shaped portion 67 extending from the second inner tubular portion 66 toward the radially inner side R1. The second inner tubular portion 66 is formed into a shape of a cylinder extending along the axial direction L. The second inner tubular portion 66 is formed so as to be open to a side (second axial side L2) opposite to the internal combustion engine E side. At an outer peripheral portion of the second inner tubular portion 66, a plurality of spline teeth extending in the axial direction L are formed while being distributed in the circumferential direction. Similar spline teeth are formed at inner peripheral portions of the second inner friction members 62. In a state in which both the spline teeth engage with each other, the second inner friction members 62 are supported by the second inner support member 65 from the radially inner side R1. Thus, the second inner friction members 62 are supported so as to be slidable in the axial direction L in a state in which rotation of the second inner friction members 62 relative to the second inner support member 65 is restricted. First through holes 11 extending through the second inner tubular portion 66 in the radial direction R (communicating an inner peripheral surface and an outer peripheral surface of the second inner tubular portion 66) are formed in the second inner tubular portion 66.

The second inner plate-shaped portion 67 is coupled to the second inner tubular portion 66 so as to rotate together with the second inner tubular portion 66. A flange member 84 drivably coupled to the intermediate shaft M is provided at an end of the second inner plate-shaped portion 67 on the radially inner side R1. Thus, the second inner tubular portion 66 and the intermediate shaft M are coupled together via the second inner plate-shaped portion 67.

The second outer support member 71 includes a second outer tubular portion 72 that supports the second outer friction members 63 from the radially outer side R2, a second outer plate-shaped portion 73 extending from the second outer tubular portion 72 toward the radially inner side R1, and a tubular coupling portion 74 coupled to the tubular support portion 31. The second outer tubular portion 72 is formed into a shape of a cylinder extending along the axial direction L. The second outer tubular portion 72 is formed so as to be open to the internal combustion engine E side (first axial side L1). At an inner peripheral portion of the second outer tubular portion 72, a plurality of spline teeth extending in the axial direction L are formed while being distributed in the circumferential direction. Similar spline teeth are formed at outer peripheral portions of the second outer friction members 63. In a state in which both the spline teeth engage with each other, the second outer friction members 63 are supported by the second outer support member 71 from the radially outer side R2. Thus, the second outer friction members 63 are supported so as to be slidable in the axial direction L in a state in which rotation of the second outer friction members 63 relative to the second outer support member 71 is restricted. Second through holes 12 extending through the second outer tubular portion 72 in the radial direction R (communicating an inner peripheral surface and an outer peripheral surface of the second outer tubular portion 72) are formed in the second outer tubular portion 72.

The second outer plate-shaped portion 73 is a member having a shape of an annular plate extending toward the radially inner side R1 from an end of the second outer tubular portion 72 on the second axial side L2. The tubular coupling portion 74 is provided so as to extend toward the first axial side L1 from the end of the second outer tubular portion 72 on the first axial side L1, and is formed into a shape of a cylinder extending along the axial direction L. The tubular coupling portion 74 is drivably coupled to the tubular support portion 31 so as to rotate together with the tubular support portion 31 through engagement between an outer peripheral portion of the tubular coupling portion 74 and the inner peripheral portion of the tubular support portion 31. The second outer tubular portion 72, the second outer plate-shaped portion 73, and the tubular coupling portion 74 are formed integrally.

The second outer tubular portion 72 is arranged on the radially inner side R1 of the tubular support portion 31, and is structured by a member independent of the tubular support portion 31. The partition member 85 attached to the inner peripheral surface of the tubular support portion 31 exists on the first axial side L1 of the second outer tubular portion 72. The second outer tubular portion 72 is supported by the partition member 85 from the first axial side L1. A support member 87 attached to the second axial side L2 of the second support wall 25 exists on the second axial side L2 of the second outer plate-shaped portion 73. The second outer plate-shaped portion 73 is supported by the support member 87 from the second axial side L2. That is, the second outer support member 71 is located between the partition member 85 and the support member 87 in the axial direction L, and movement of the second outer support member 71 in the axial direction L is restricted.

The second pressing member 77 is a member (second piston) configured such that, when oil having a predetermined hydraulic pressure is supplied to a second hydraulic oil chamber H2 from the hydraulic controller (not illustrated), the second pressing member 77 slides in the axial direction L depending on the hydraulic pressure to press the second friction members 61. The second pressing member 77 presses the second friction members 61 toward the first axial side L1.

In this embodiment, the first friction members 41 are arranged on the first axial side L1 of the second friction members 61. The first friction members 41 and the second friction members 61 are arranged so as to overlap each other when viewed in the axial direction L.

As illustrated in FIG. 3 and FIG. 4, the vehicle drive apparatus 1 includes the rotation sensor 18 for detecting rotation of the rotating electrical machine MG. The rotation sensor 18 is provided between the rotor support member 30 (tubular support portion 31) and the second support wall 25 in the axial direction L. The rotation sensor 18 is a sensor for detecting the rotational position of the rotor Ro relative to the stator St of the rotating electrical machine MG. For example, a resolver may be used as the rotation sensor 18. The rotation sensor 18 includes a sensor stator 96 supported on the case 2, and a sensor rotor 97 configured to rotate together with the rotor Ro.

The sensor stator 96 is fixed to the side surface of the second support wall 25 on the first axial side L1. The sensor rotor 97 is fixed to an inner peripheral surface of the support open end 33 of the tubular support portion 31. The sensor stator 96 and the sensor rotor 97 are provided at positions where the sensor stator 96 and the sensor rotor 97 overlap the first frictional engagement device CL1 and the second frictional engagement device CL2 when viewed in the axial direction L and overlap the coil end portion Ce when viewed in the radial direction R.

3. Cooling Structure for Engagement Devices and Rotating Electrical Machine

Description is given of a cooling structure for the engagement devices CL1 and CL2 and the rotating electrical machine MG in the vehicle drive apparatus 1 according to this embodiment. In this embodiment, the description is given assuming, for example, a situation in which a stopped vehicle starts to travel by using the torque of the rotating electrical machine MG in an electric traveling mode. At the start of traveling, it is necessary that at least the second frictional engagement device CL2 provided on a downstream side of the rotating electrical machine MG be supplied with oil having a predetermined hydraulic pressure to engage the second frictional engagement device CL2 in a state in which the rotating electrical machine MG is outputting the torque. When the transmission TM is the stepped automatic transmission as in this embodiment, it is necessary that one or more shifting engagement devices out of the plurality of shifting engagement devices provided in the transmission TM be supplied with oil having a predetermined hydraulic pressure to engage the shifting engagement device(s).

As illustrated in FIG. 2, in this embodiment, the rotating electrical machine MG is drivably coupled so as to operate in association with an unillustrated oil pump via a chain transfer mechanism 83 and the second outer support member 71 of the second frictional engagement device CL2. For example, when the vehicle starts to travel, the oil pump is driven by using the torque of the rotating electrical machine MG that is output to drive the wheels W. Oil discharged from the oil pump is supplied to the second frictional engagement device CL2 and the shifting engagement devices in the transmission TM to engage those devices. Thus, the vehicle can start to travel appropriately in the electric traveling mode. The vehicle drive apparatus 1 according to this embodiment is not provided with a pump having a dedicated drive motor (electric pump) independently of the oil pump. By omitting installation of such an electric pump, the cost of the vehicle drive apparatus 1 is reduced. The present disclosure is not limited to this structure, but the electric pump may be provided.

In order that the hydraulic pressure of the oil discharged from the oil pump be increased to a hydraulic pressure necessary to engage the engagement devices, the rotating electrical machine MG needs to rotate at a rotation speed equal to or higher than a predetermined reference rotation speed. When a certain shift speed is set in the transmission TM, the rotation speed of the intermediate shaft M that is determined depending on a vehicle speed is lower than the reference rotation speed in a state in which the vehicle speed is low to some extent. In order to smooth out the rotation speed difference (differential rotation), it is necessary to engage the second frictional engagement device CL2 while slipping (achieve the slip engagement state). In the slip engagement state of the second frictional engagement device CL2, the second friction members 61 of the second frictional engagement device CL2 generate heat due to friction or the like. Therefore, it is necessary to effectively cool the second friction members 61. When a current flows through a coil of the stator St of the rotating electrical machine MG, the coil generates heat due to generation of Joule heat. Therefore, it is necessary to effectively cool the coil (for example, the coil end portions Ce that are portions protruding in the axial direction L from a stator core).

In view of the above, the vehicle drive apparatus 1 according to this embodiment includes, as illustrated in FIG. 3 and FIG. 4, a first cooling oil passage P1 for mainly cooling the second friction members 61 of the second frictional engagement device CL2, and a second cooling oil passage P2 for mainly cooling the coil end portions Ce of the rotating electrical machine MG. Those oil passages are two independent lines of oil passages. The first cooling oil passage P1 and the second cooling oil passage P2 are provided inside the tubular support portion 31. The second cooling oil passage P2 corresponds to a cooling oil passage provided in an area where the first frictional engagement device CL1 is arranged and configured such that oil for cooling the rotating electrical machine MG passes through the second cooling oil passage P2.

As illustrated in FIG. 4, the oil discharged from the oil pump is supplied to a space between the second inner plate-shaped portion 67 and the second pressing member 77 in the axial direction L (space inside the second frictional engagement device CL2) via an oil flow passage formed in the case 2 and a shaft-periphery oil passage 91 formed between an inner peripheral surface of the sleeve 26 and an outer peripheral surface of the intermediate shaft M. Further, the oil discharged from the oil pump is supplied to a space between the first inner plate-shaped portion 47 and the first pressing member 57 in the axial direction L (space inside the first frictional engagement device CL1) and a space between the first inner plate-shaped portion 47 and the second inner plate-shaped portion 67 in the axial direction L (space between the first frictional engagement device CL1 and the second frictional engagement device CL2) via the oil flow passage formed in the case 2, an intra-shaft oil passage 92 formed inside the intermediate shaft M, and communication holes formed in the intermediate shaft M. Further, the oil discharged from the oil pump is supplied to a space between the plate-shaped support portion 35 and the first pressing member 57 in the axial direction L (space on the first axial side L1 of the first frictional engagement device CL1) via the oil flow passage formed in the case 2, the intra-shaft oil passage 92 formed inside the intermediate shaft M, and a shaft-periphery oil passage 93 formed between an inner peripheral surface of the first protrusion 23 and an outer peripheral surface of the input shaft I. In FIG. 3 and FIG. 4, main oil flows are indicated by dashed line arrows.

The first cooling oil passage P1 is an oil passage through which the oil supplied to the space between the second inner plate-shaped portion 67 and the second pressing member 77 in the axial direction L is supplied to the second friction members 61 to cool the second friction members 61 and is then guided toward the second axial side L2 beyond the rotor Ro. In order to form the first cooling oil passage P1, the second inner tubular portion 66 and the second outer tubular portion 72 are perforated tubular portions having the first through holes 11 and the second through holes 12 as illustrated in FIG. 4, respectively.

Specifically, the second inner tubular portion 66 has the first through holes 11 extending through the second inner tubular portion 66 in the radial direction R at positions where the first through holes 11 overlap the second friction members 61 in the axial direction L when viewed in the radial direction R. The second outer tubular portion 72 has the second through holes 12 extending through the second outer tubular portion 72 in the radial direction R at positions where the second through holes 12 overlap the second friction members 61 in the axial direction L when viewed in the radial direction R.

As illustrated in FIG. 4, the oil supplied to a space between the second inner plate-shaped portion 67 and the second outer plate-shaped portion 73 in the axial direction L through the shaft-periphery oil passage 91 flows along the first cooling oil passage P1. Specifically, the oil reaches the second friction members 61 through the first through holes 11 formed in the second inner tubular portion 66 to cool the second friction members 61. Then, the oil whose temperature is increased by passing through the second friction members 61 flows toward the radially outer side R2 of the second outer tubular portion 72 through the second through holes 12 formed in the second outer tubular portion 72. A second oil passage 94 through which the oil flowing into the first area 98 flows toward the second axial side L2 is formed between the inner peripheral surface of the tubular support portion 31 and the outer peripheral surface of the second outer tubular portion 72. The oil flowing toward the radially outer side R2 of the second outer tubular portion 72 flows into the first area 98 on the inner peripheral surface of the tubular support portion 31, and then flows along the second oil passage 94.

In this embodiment, the second support wall 25 is provided so as to cover an end of the coil end portion Ce on the second axial side L2 as illustrated in FIG. 3 and FIG. 4. The oil flowing along the second oil passage 94 further flows toward the second axial side L2 along the tubular support portion 31, and flows out from the support open end 33 toward the second axial side L2 beyond the second support wall 25. That is, the majority of the oil discharged from the second oil passage 94 toward the second axial side L2 flows toward the second axial side L2 beyond the second support wall 25. Therefore, in this example, the oil having a relatively high temperature after cooling the second frictional engagement device CL2 hardly reaches the coil end portion Ce. Thus, it is possible to reduce the amount of the relatively high temperature oil that reaches the coil end portion Ce after cooling the second friction members 61 of the second frictional engagement device CL2, and therefore suppress a decrease in the cooling efficiency of the coil end portion Ce. Accordingly, a function of a discharge oil passage through which the oil is discharged from the first area 98 is provided in the second oil passage 94 on the second axial side L2 of the tubular support portion 31 beyond the rotor Ro.

As illustrated in FIG. 3 and FIG. 4, the second cooling oil passage P2 is an oil passage through which the oil supplied to the space between the first inner plate-shaped portion 47 and the first pressing member 57, the oil supplied to the space between the first inner plate-shaped portion 47 and the second inner plate-shaped portion 67, and the oil supplied to the space between the plate-shaped support portion 35 and the first pressing member 57 are supplied to the first friction members 41 to cool the first friction members 41 and are then supplied to the rotor Ro and the stator St of the rotating electrical machine MG. In order to form the second cooling oil passage P2, as illustrated in FIG. 4, the first inner tubular portion 46 and the tubular support portion 31 are perforated tubular portions having the fourth through holes 14 and the third through holes 13, respectively, and the rotor holding portions 37 are perforated plate-shaped portions having sixth through holes 16.

Specifically, the first inner tubular portion 46 has the fourth through holes 14 extending through the first inner tubular portion 46 in the radial direction R at positions where the fourth through holes 14 overlap the first friction members 41 when viewed in the radial direction R. The tubular support portion 31 has the third through holes 13 extending through the tubular support portion 31 in the radial direction R at positions where the third through holes 13 overlap the first friction members 41 when viewed in the radial direction R. The rotor holding portions 37 have the sixth through holes 16 extending through the rotor holding portions 37 in the axial direction L.

As illustrated in FIG. 3 and FIG. 4, the oil supplied to the space between the first inner plate-shaped portion 47 and the first pressing member 57 reaches the first friction members 41 through the fourth through holes 14 formed in the first inner tubular portion 46 to cool the first friction members 41. The first friction members 41 are provided between the internal combustion engine E and the rotating electrical machine MG on the power transfer path T, and may generate heat through slip engagement when the internal combustion engine E is started by using the torque of the rotating electrical machine MG, but the heat generation amount is basically small. Thus, the temperature of the oil is unlikely to increase after the oil passes through the first friction members 41. The oil supplied to the space between the first inner plate-shaped portion 47 and the second inner plate-shaped portion 67 and the oil supplied to the space between the plate-shaped support portion 35 and the first pressing member 57 reach the first friction members 41 through the second axial side L2 and the first axial side L1 of the first inner tubular portion 46 to cool the first friction members 41. The third through holes 13 serving as a first oil passage through which the oil flowing into the second area 99 flows toward the rotating electrical machine MG are formed in the tubular support portion 31. The oil flowing into the first friction members 41 flows into the second area 99 on the inner peripheral surface of the tubular support portion 31. Then, the oil flows toward the radially outer side R2 of the tubular support portion 31 through the third through holes 13, and flows in the axial direction L through an oil passage formed between the rotor Ro and the tubular support portion 31. Then, the oil is discharged through the sixth through holes 16 of the rotor holding portions 37. The discharged oil is supplied to the coil end portions Ce of the stator St by splashing toward the radially outer side R2 by a centrifugal force generated through the rotation of the rotor Ro to cool the coil end portions Ce.

In this embodiment, as illustrated in FIG. 3 and FIG. 4, the relatively high temperature oil passing through the second frictional engagement device CL2 flows into the first area 98 on the inner peripheral surface of the tubular support portion 31, and the relatively low temperature oil passing through a portion other than the second frictional engagement device CL2 flows into the second area 99 on the inner peripheral surface of the tubular support portion 31.

To give an additional description, the relatively high temperature oil passing through the first cooling oil passage P1 formed inside the second frictional engagement device CL2 flows into the first area 98. The first cooling oil passage P1 is formed by the constituent members of the second frictional engagement device CL2 and the partition member 85. That is, the oil flowing through the second frictional engagement device CL2 reaches the first area 98 by being guided by the constituent members of the second frictional engagement device CL2 and the partition member 85.

The relatively low temperature oil passing through the second cooling oil passage P2 formed in the area where the first frictional engagement device CL1 is arranged flows into the second area 99. The first frictional engagement device CL1 is arranged between the second frictional engagement device CL2 and the plate-shaped support portion 35 of the rotor support member 30 in the axial direction L, and is arranged between the input shaft I and the tubular support portion 31 of the rotor support member 30 in the radial direction R. The area where the first frictional engagement device CL1 is arranged is an area surrounded by the second frictional engagement device CL2, the rotor support member 30, and the input shaft I. The second cooling oil passage P2 is formed by the constituent members of the first frictional engagement device CL1, the partition member 85, a portion of the second frictional engagement device CL2 that is located closest to the second axial side L2 (second inner plate-shaped portion 67), and the plate-shaped support portion 35 of the rotor support member 30. That is, the oil flowing through the area where the first frictional engagement device CL1 is arranged reaches the second area 99 by being guided by the constituent members of the first frictional engagement device CL1, the portion of the second frictional engagement device CL2 that is located closest to the second axial side L2 (second inner plate-shaped portion 67), the plate-shaped support portion 35 of the rotor support member 30, and the partition member 85.

As described above, the first area 98 and the second area 99 are formed side by side in the axial direction L, but are partitioned from each other by the partition member 85. Therefore, a flow of oil from the first area 98 to the second area 99 and a flow of oil from the second area 99 to the first area 98 are restricted by the partition member 85. Thus, mixing of the relatively high temperature oil supplied to the first area 98 and the relatively low temperature oil supplied to the second area 99 is suppressed. Accordingly, it is possible to appropriately supply the relatively low temperature oil to the rotating electrical machine MG while avoiding the occurrence of a situation in which the relatively high temperature oil is supplied to the rotating electrical machine MG. That is, in this embodiment, the partition member 85 arranged inside the tubular support portion 31 so as to partition the first area 98 and the second area 99 from each other functions as an inflow suppression portion 88. The inflow suppression portion 88 is provided between the first frictional engagement device CL1 and the second frictional engagement device CL2, and exerts a function of suppressing the occurrence of a situation in which the oil passing through the second frictional engagement device CL2 flows into the second cooling oil passage P2.

2. Other Embodiments

Next, other embodiments of the vehicle drive apparatus are described.

(1) In the embodiment described above, the diameter of the outer peripheral surface of the partition member 85 is equal to the outside diameter of the recess of the engagement groove 51A. The diameter of the outer peripheral surface of the partition member 85 may be larger than the outside diameter of the recess of the engagement groove 51A. Alternatively, the diameter of the outer peripheral surface of the partition member 85 may be smaller than the outside diameter of the recess of the engagement groove 51A. In this case, the difference between the diameter of the outer peripheral surface of the partition member 85 and the outside diameter of the recess of the engagement groove 51A may be small enough to reduce the amount of oil flowing from the first area 98 into the second area 99 as compared to a case where the partition member 85 is not provided, or may be such a slight difference that a clearance from the outer peripheral surface of the partition member 85 can restrict the flow of oil.

(2) In the embodiment described above, the first friction members 41 of the first frictional engagement device CL1 engage with the engagement grooves 51A formed on the inner peripheral surface of the tubular support portion 31 from the radially inner side R1. There may be employed a structure in which the first friction members 41 of the first frictional engagement device CL1 do not directly engage with the tubular support portion 31 such that a support member that supports the first friction members 41 of the first frictional engagement device CL1 from the radially outer side R2 is arranged on the radially inner side R1 of the tubular support portion 31.

(3) In the embodiment described above, the second outer tubular portion 72 that supports the second friction members 61 of the second frictional engagement device CL2 from the radially outer side R2 is arranged on the radially inner side R1 of the tubular support portion 31. There may be employed a structure in which the second friction members 61 of the second frictional engagement device CL2 directly engage with the tubular support portion 31 by engaging with the engagement grooves 51A formed on the inner peripheral surface of the tubular support portion 31 from the radially inner side R1.

(4) In the embodiment described above, the oil flowing into the second area 99 is supplied to both the rotor Ro and the stator St of the rotating electrical machine MG. The oil flowing into the second area 99 may be supplied to one of the rotor Ro and the stator St of the rotating electrical machine MG.

(5) In the embodiment described above, the second outer tubular portion 72 is supported by the partition member 85 from the first axial side L1. The second outer tubular portion 72 may be supported by a member other than the partition member 85 from the first axial side L1.

(6) In the embodiment described above, the single partition member 85 prevents the oil from flowing from the first area 98 toward the second area 99 and also from the second area 99 toward the first area 98. There may be provided a first partition member configured to prevent the oil from flowing from the first area 98 toward the second area 99, and a second partition member configured to prevent the oil from flowing from the second area 99 toward the first area 98.

(7) In the embodiment described above, description is given taking the exemplary structure in which the partition member 85 functions as the inflow suppression portion 88. However, the specific structure of the inflow suppression portion 88 is not limited to this structure. For example, the inflow suppression portion 88 may be structured by using another wall-shaped or plate-shaped member provided between the first frictional engagement device CL1 and the second frictional engagement device CL2 instead of using the partition member 85. The wall-shaped or plate-shaped member may be the constituent member of the first frictional engagement device CL1 or the second frictional engagement device CL2, or may be a member provided independently of those members. Alternatively, the inflow suppression portion 88 may be structured by using both the partition member 85 and a wall-shaped or plate-shaped member provided independently of the partition member 85.

(8) In the embodiment described above, description is given taking the exemplary structure in which the two engagement devices are the frictional engagement devices. The present disclosure is not limited to this structure. One of the engagement devices may be an engagement device other than the frictional engagement device, such as an intermesh engagement device. More specifically, the engagement device other than the frictional engagement device, such as an intermesh engagement device, may be arranged at the position where the first frictional engagement device CL1 is arranged.

(9) The structures disclosed in the embodiments described above are also applicable in combination with the structures disclosed in the other embodiments without causing any contradiction. Regarding other structures as well, the embodiments disclosed herein are only illustrative in all respects. Thus, various modifications may be made as appropriate without departing from the spirit of the disclosure.

3. Summary of Embodiment

A summary of the vehicle drive apparatus described above is described below.

The vehicle drive apparatus includes the engagement device (CL1), the rotating electrical machine (MG), and the frictional engagement device (CL2) on the power transfer path (T) connecting the input member (I) drivably coupled to the internal combustion engine (E) and the output member (M) drivably coupled to the wheels. The engagement device (CL1), the rotating electrical machine (MG), and the frictional engagement device (CL2) are provided in order from the input member (I) side.

The engagement device (CL1) and the frictional engagement device (CL2) are arranged side by side in the axial direction (L). The engagement device (CL1) and the frictional engagement device (CL2) are arranged on the radially inner side (R1) of the rotating electrical machine (MG) so as to overlap the rotating electrical machine (MG) at least in part when viewed in the radial direction. The rotating electrical machine (MG) includes the rotor (Ro) and the rotor support member (30) that supports the rotor (Ro). The rotor support member (30) includes the tubular portion (31) located on the radially inner side (R1) of the rotor (Ro), extending in the axial direction (L), and formed into the tubular shape. The cooling oil passage (P2) provided in the area where the engagement device (CL1) is arranged and configured such that the oil for cooling the rotating electrical machine (MG) passes through the cooling oil passage (P2) and the inflow suppression portion (88) provided between the engagement device (CL1) and the frictional engagement device (CL2) and configured to suppress the occurrence of a situation in which the oil passing through the frictional engagement device (CL2) flows into the cooling oil passage (P2) are provided inside the tubular portion (31).

According to this structure, the oil flowing through the cooling oil passage (P2) is supplied to the rotating electrical machine (MG), and therefore the rotating electrical machine (MG) can be cooled by the oil. The inflow suppression portion (88) suppresses the occurrence of the situation in which the oil passing through the frictional engagement device (CL2) flows into the cooling oil passage (P2). Therefore, it is possible to suppress the occurrence of the situation in which the relatively high temperature oil heated by passing through the frictional engagement device (CL2) flows into the cooling oil passage (P2), and thus suppress an increase in the temperature of the oil flowing through the cooling oil passage (P2). As a result, the relatively low temperature oil can be supplied to the rotating electrical machine (MG), and accordingly the rotating electrical machine (MG) can be cooled appropriately.

It is preferable that the first area (98) into which the oil passing through the frictional engagement device (CL2) flows and the second area (99) into which the oil passing through the cooling oil passage (P2) flows be formed side by side in the axial direction (L) on the inner peripheral surface of the tubular portion (31), and the inflow suppression portion (88) include the partition member (85) that partitions the first area (98) and the second area (99) from each other.

According to this structure, the oil flowing toward the radially outer side (R2) through the frictional engagement device (CL2) is stemmed by the first area (98) on the inner peripheral surface of the tubular portion (31) located on the radially outer side (R2) of the frictional engagement device (CL2). Therefore, it is possible to suppress the occurrence of the situation in which the relatively high temperature oil passing through the frictional engagement device (CL2) flows toward the rotor (Ro) or the like located on the radially outer side (R2) of the tubular portion (31). Further, the partition member (85) can suppress the occurrence of the situation in which the oil flows from the first area (98) into the second area (99). Thus, it is possible to suppress the occurrence of the situation in which the relatively high temperature oil passing through the frictional engagement device (CL2) flows into the second area (99), and accordingly suppress the occurrence of the situation in which the relatively high temperature oil flows into the cooling oil passage (P2).

It is preferable that the cooling oil passage (P2) be formed by the partition member (85) and the constituent members of the engagement device (CL1).

According to this structure, the cooling oil passage (P2) is formed by using the partition member (85) and the engagement device (CL1). Therefore, the structure of the vehicle drive apparatus (1) can be simplified as compared to a case where dedicated members for forming the cooling oil passage (P2) are provided.

It is preferable that, assuming that the first axial side (L1) is the side where the engagement device (CL1) is located relative to the frictional engagement device (CL2) in the axial direction (L), the tubular outer support member (72) that supports the friction members (61) of the frictional engagement device (CL2) from the radially outer side (R2) be arranged on the radially inner side (R1) of the tubular portion (31), and the outer support member (72) be supported by the partition member (85) from the first axial side (L1).

According to this structure, even when the tubular portion (31) of the rotor support member (30) and the outer support member (72) of the frictional engagement device (CL2) are independent of each other, movement of the outer support member (72) toward the first axial side (L1) relative to the tubular portion (31) can be restricted. The partition member (85) also has the function of restricting the movement of the outer support member (72) toward the first axial side (L1). Thus, there is no need to provide a dedicated member for restricting the movement of the outer support member (72) toward the first axial side (L1). Accordingly, the apparatus can be simplified and downsized.

It is preferable that, assuming that the second axial side (L2) is the side where the frictional engagement device (CL2) is located relative to the engagement device (CL1) in the axial direction (L), the tubular outer support member (72) that supports the friction members (61) of the frictional engagement device (CL2) from the radially outer side (R2) be arranged on the radially inner side (R1) of the tubular portion (31), the outer support member (72) be formed into the tubular shape and structured by a member independent of the tubular portion (31), and the second oil passage (94) through which the oil flowing into the first area (98) flows toward the second axial side (L2) be formed between the inner peripheral surface of the tubular portion (31) and the outer peripheral surface of the outer support member (72).

According to this structure, the second oil passage (94) is formed between the tubular portion (31) and the outer support member (72). Therefore, the oil flowing into the first area (98) can actively flow toward the second axial side (L2) through the second oil passage (94). Thus, it is possible to suppress the occurrence of the situation in which the oil flowing into the first area (98) flows into the second area (99) that exists opposite to the second axial side (L2).

It is preferable that the engagement grooves (51A) extending in the axial direction (L) be formed on the inner peripheral surface of the tubular portion (31), the friction members (41) of the engagement device (CL1) engage with the engagement grooves (51A) from the radially inner side (R1), and the diameter of the outer peripheral surface of the partition member (85) be equal to or larger than the outside diameter of the recess of each of the engagement grooves (51A).

According to this structure, also in the structure in which the friction members (41) of the frictional engagement device (CL1) engage with the engagement grooves (51A) on the inner peripheral surface of the tubular portion (31), a clearance is hardly formed between the partition member (85) and the engagement groove (51A). Thus, it is possible to appropriately suppress the occurrence of the situation in which the oil flows from the first area (98) into the second area (99).

It is preferable that the first oil passages (13) through which the oil flows from the second area (99) toward the rotating electrical machine (MG) be formed in the tubular portion, and the inlets of the first oil passages (13) be open to the second area (99).

According to this structure, the oil flowing into the second area (99) can appropriately be introduced into the first oil passages (13). Therefore, the oil flowing into the second area (99) can smoothly flow toward the rotating electrical machine (MG).

It is preferable that, assuming that the second axial side (L2) is the side where the frictional engagement device (CL2) is located relative to the engagement device (CL1) in the axial direction (L), the discharge oil passage (94) through which the oil is discharged from the first area (98) be formed on the second axial side (L2) of the tubular portion (31) beyond the rotor (Ro).

According to this structure, the oil flowing into the first area (98) through the frictional engagement device (CL2) can flow toward the second axial side L2 of the tubular portion (31) beyond the rotor (Ro) through the discharge oil passage (94). Thus, it is possible to suppress the occurrence of the situation in which the relatively high temperature oil passing through the frictional engagement device (CL2) flows into the rotating electrical machine (MG).

It is preferable that the transmission (TM) be further provided on the power transfer path (T), and the frictional engagement device (CL2) be arranged between the rotating electrical machine (MG) and the transmission (TM) on the power transfer path (T).

According to this structure, when the frictional engagement device (CL2) is engaged while slipping in order to smooth out the difference between the rotation speed on the rotating electrical machine (MG) side and the rotation speed on the transmission (TM) side, for example, at the start of traveling of the vehicle, it is possible to suppress the occurrence of the situation in which the relatively high temperature oil heated by passing through the frictional engagement device (CL2) that generates heat due to frictional heat or the like flows into the cooling oil passage (P2).

INDUSTRIAL APPLICABILITY

The technology disclosed herein can be used for the vehicle drive apparatus provided with the engagement device, the rotating electrical machine, and the frictional engagement device.

The invention claimed is:

1. A vehicle drive apparatus, comprising
an engagement device,
a rotating electrical machine, and
a frictional engagement device on a power transfer path connecting an input drivably coupled to an internal combustion engine and an output drivably coupled to a wheel, wherein:
   the engagement device, the rotating electrical machine, and the frictional engagement device are provided in order from the input,
   the engagement device and the frictional engagement device are arranged side by side in an axial direction,
   the engagement device and the frictional engagement device are arranged on a radially inner side of the rotating electrical machine so as to overlap the rotating electrical machine at least in part when viewed in a radial direction,
   the rotating electrical machine includes a rotor and a rotor support that supports the rotor,
   the rotor support includes a tube located on a radially inner side of the rotor, extending in the axial direction, and formed into a tubular shape, and
   a cooling oil passage provided in an area where the engagement device is arranged and configured such that oil for cooling the rotating electrical machine passes through the cooling oil passage and an inflow suppression provided between the engagement device and the frictional engagement device and configured to suppress occurrence of a situation in which oil passing through the frictional engagement device flows into the cooling oil passage are provided inside the tube.

2. The vehicle drive apparatus according to claim 1, wherein
   a first area into which the oil passing through the frictional engagement device flows and a second area into which the oil passing through the cooling oil passage flows are formed side by side in the axial direction on an inner peripheral surface of the tube, and
   the inflow suppression includes a partition that partitions the first area and the second area from each other.

3. The vehicle drive apparatus according to claim 2, wherein the cooling oil passage is formed by the partition and a constituent of the engagement device.

4. The vehicle drive apparatus according to claim 3, wherein, assuming that a first axial side is a side where the engagement device is located relative to the frictional engagement device in the axial direction,
   a tubular outer support that supports a friction member of the frictional engagement device from a radially outer side is arranged on the radially inner side of the tube, and
   the outer support is supported by the partition from the first axial side.

5. The vehicle drive apparatus according to claim 4, wherein, assuming that a second axial side is a side where the frictional engagement device is located relative to the engagement device in the axial direction,
   the outer support is formed into a tubular shape, and is structured by a member independent of the tube, and
   a second oil passage through which the oil flowing into the first area flows toward the second axial side is formed between the inner peripheral surface of the tube and an outer peripheral surface of the outer support.

6. The vehicle drive apparatus according to claim 5, wherein
   an engagement groove extending in the axial direction is formed on the inner peripheral surface of the tube,
   a friction member of the engagement device engages with the engagement groove from the radially inner side, and
   a diameter of an outer peripheral surface of the partition is equal to or larger than an outside diameter of a recess of the engagement groove.

7. The vehicle drive apparatus according to claim 6, wherein a first oil passage through which the oil flows from the second area toward the rotating electrical machine is formed in the tube, and an inlet of the first oil passage is open to the second area.

8. The vehicle drive apparatus according to claim 7, wherein, assuming that a second axial side is a side where the frictional engagement device is located relative to the engagement device in the axial direction, a discharge oil passage through which the oil is discharged from the first area is formed on the second axial side of the tube beyond the rotor.

9. The vehicle drive apparatus according to claim 8, wherein a transmission is further provided on the power transfer path, and the frictional engagement device is arranged between the rotating electrical machine and the transmission on the power transfer path.

10. The vehicle drive apparatus according to claim 2, wherein, assuming that a first axial side is a side where the engagement device is located relative to the frictional engagement device in the axial direction, a tubular outer support that supports a friction member of the frictional engagement device from a radially outer side is arranged on the radially inner side of the tube, and the outer support is supported by the partition from the first axial side.

11. The vehicle drive apparatus according to claim 10, wherein, assuming that a second axial side is a side where the frictional engagement device is located relative to the engagement device in the axial direction, the outer support is formed into a tubular shape, and is structured by a member independent of the tube, and a second oil passage through which the oil flowing into the first area flows toward the second axial side is formed between the inner peripheral surface of the tube and an outer peripheral surface of the outer support.

12. The vehicle drive apparatus according to claim 10, wherein a first oil passage through which the oil flows from the second area toward the rotating electrical machine is formed in the tube, and an inlet of the first oil passage is open to the second area.

13. The vehicle drive apparatus according to claim 10, wherein, assuming that a second axial side is a side where the frictional engagement device is located relative to the engagement device in the axial direction, a discharge oil passage through which the oil is discharged from the first area is formed on the second axial side of the tube beyond the rotor.

14. The vehicle drive apparatus according to claim 2, wherein, assuming that a second axial side is a side where the frictional engagement device is located relative to the engagement device in the axial direction, a tubular outer support that supports a friction member of the frictional engagement device from a radially outer side is arranged on the radially inner side of the tube, the outer support is formed into a tubular shape, and is structured by a member independent of the tube, and a second oil passage through which the oil flowing into the first area flows toward the second axial side is formed between the inner peripheral surface of the tube and an outer peripheral surface of the outer support.

15. The vehicle drive apparatus according to claim 14, wherein a first oil passage through which the oil flows from the second area toward the rotating electrical machine is formed in the tube, and an inlet of the first oil passage is open to the second area.

16. The vehicle drive apparatus according to claim 14, wherein a discharge oil passage through which the oil is discharged from the first area is formed on the second axial side of the tube beyond the rotor.

17. The vehicle drive apparatus according to claim 2, wherein an engagement groove extending in the axial direction is formed on the inner peripheral surface of the tube, a friction member of the engagement device engages with the engagement groove from the radially inner side, and a diameter of an outer peripheral surface of the partition is equal to or larger than an outside diameter of a recess of the engagement groove.

18. The vehicle drive apparatus according to claim 2, wherein a first oil passage through which the oil flows from the second area toward the rotating electrical machine is formed in the tube, and an inlet of the first oil passage is open to the second area.

19. The vehicle drive apparatus according to claim 2, wherein, assuming that a second axial side is a side where the frictional engagement device is located relative to the engagement device in the axial direction, a discharge oil passage through which the oil is discharged from the first area is formed on the second axial side of the tube beyond the rotor.

20. The vehicle drive apparatus according to claim 1, wherein a transmission is further provided on the power transfer path, and the frictional engagement device is arranged between the rotating electrical machine and the transmission on the power transfer path.

* * * * *